United States Patent [19]

Sprinkle, III et al.

[11] Patent Number: 5,092,352
[45] Date of Patent: Mar. 3, 1992

[54] CHEWING TOBACCO PRODUCT

[75] Inventors: Robert S. Sprinkle, III; Eugene Glock, both of Richmond, Va.

[73] Assignee: American Brands, Inc., New York, N.Y.

[21] Appl. No.: 561,356

[22] Filed: Dec. 14, 1983

[51] Int. Cl.⁵ .................. A24B 13/00; A24B 13/02
[52] U.S. Cl. ............................. 131/352; 131/347; 131/366; 426/3; 426/4
[58] Field of Search ............... 131/366, 352, 347; 426/6, 3, 4

[56] References Cited

U.S. PATENT DOCUMENTS

| | | | |
|---|---|---|---|
| 214,639 | 4/1879 | Emery | 131/352 |
| 904,521 | 11/1908 | Ellis | 131/352 |
| 1,407,274 | 2/1922 | Hibbert | 131/352 |
| 1,926,564 | 11/1933 | Sharp . | |
| 3,826,847 | 7/1974 | Ogawa et al. . | |
| 4,093,752 | 6/1978 | Withycombe et al. . | |
| 4,252,830 | 3/1981 | Kehoe et al. . | |
| 4,452,820 | 6/1984 | D'Amelia et al. | 426/3 |

*Primary Examiner*—V. Millin
*Attorney, Agent, or Firm*—Pennie & Edmonds

[57] ABSTRACT

A chewing tobacco product that does not disintegrate during mastication characterized by a uniform flavor and a smooth chew that consists of a blend of 10 to 70% of particulate tobacco in a chewing gum base present in the amount of 20 to 75% of the product, together with a glycerine humectant in the amount of 2 to 12% of the product, and sweetening and flavoring agents.

12 Claims, No Drawings

CHEWING TOBACCO PRODUCT

TECHNICAL FIELD

The invention relates to a chewing tobacco product that does not disintegrate during mastication and has a uniform flavor, a more pleasant appearance and provides a smooth chew.

BACKGROUND OF THE INVENTION

The chewing tobacco products on the market consist of plugs or packages of chewing tobacco. Both products include a mixture of tobacco leaf and tobacco casing, which may be comprised of a mixture of flavors, sweeteners and humectants. Tobacco casing is frequently used in chewing tobacco products. In the preparation of tobacco in the form of plugs, tobacco casing is mixed with the tobacco leaf and formed into a plug of the desired size. The loose tobacco product is a mixture of the tobacco leaf and tobacco casing usually sold in a package designed to retain flavor and moisture.

U.S. Pat. Nos. 865,026 and 904,521, both to Carleton Ellis, relate to tobacco preparations adapted for chewing purposes wherein the included tobacco is thoroughly sealed with a waterproofing masticable waxy body. The Ellis patents disclose, as their primary aspect, a tobacco substitute for weening and curing the habit of tobacco chewing. Use of the Ellis tobacco substitute is indicated to provide the user with the familiar taste of tobacco and its physiological effects, but to a lesser degree. U.S. Pat. No. 1,376,586 to Francis Schwartz describes a tablet of chewing tobacco completely covered with chicle. U.S. Pat. No. 4,317,837 to Gary Kehoe et al describes a tobacco flavored chewing gum containing a high level of inert fillers. The chewing gum, further, includes at least 10% air voids entrapped in the matrix which become filled with moisture on chewing, causing an increase in the volume. U.S. Pat. No. 3,845,217 to Ove Birger Ferno et al relates to a chewable smoking substitute containing nicotine in a gum base and a water-soluble buffering agent to maintain the pH of the saliva at about 7.4.

The prior art is considered to suffer from various problems and disadvantages. Possibly foremost of the problems and disadvantages relating to the use of the product are the inability to maintain integrity during mastication, and the products are found generally not to provide a smooth chew and unvariable taste characteristics.

In addition to the above prior art, chewing compositions comprising nicotine per se, bound to a cationic exchanger and embodied in a gum base, have been proposed. The purpose of these compositions, also, is to provide a substitute for tobacco use and/or smoking. These compositions, comprising nicotine per se in a sorbed state embodied in a high percentage of gum base to facilitate slow release under chewing have also been proposed recently. In these latest compositions the nicotine can be present as a free base or in salt form, as a complex or sorbed.

BRIEF DESCRIPTION OF THE INVENTION

In contrast to the compositions of the prior art, the chewing tobacco product of the invention comprises finely ground or particulate tobacco at levels from 10 to 70% bound with a chewing gum base. Plasticizers, together with sweetening and flavoring agents, and humectants introduce a uniform texture in the product.

The chewing tobacco product is an improvement over similar products of the prior art both as to its uniformity in color and texture. The chewing tobacco product also is an improvement over the prior art in that the flavor release is more controllable. Further, the chewing tobacco product has been found to stay together in an integrated chewable quid, and the water-soluble flavors blend with the saliva as the product is chewed. The taste characteristics may be controlled by blending fine particles of tobacco with the flavoring and sweetening agents. It goes without saying the chewing tobacco product, by its integrity, overcomes the annoyance of product break up when chewed.

The flavor level of the chewing tobacco product may be controlled by varying the ratio of tobacco to gum base materials. The blended chewing tobacco product is rolled or it may be extruded or cut into various shapes, and packaged. The final shape may be characterized as discs, cubes, or as rods in either rectangular or cylindrical form. In addition, the chewing tobacco product may be in the form of strands packaged in a pouch similar to the pouches now used for smoking tobacco. The weight and size of individual pieces in whatever shape may be controlled to give uniform portion chews.

DETAILED DESCRIPTION OF THE INVENTION

The chewing tobacco product of the invention may employ a wide variety of chewing gum compositions, with the base being present in an amount of about 20 to 75% of the composition. Suitable gum bases for use in the invention are supplied by L. A. Dreyfus Company, South Plainfield, N.J. These include a product identified by the trademark PALOJA chewing gum base consisting of natural masticatory substances in the range of 3 to 12%, synthetic masticatory substances in the range of 35 to 60%, plasticizing materials (softeners) in the range of 18 to 34%, water insoluble adjuvants (calcium carbonate) in the range of 12 to 20%, and not more than 0.1% antioxidant (butylated hydroxytoluene). Additional chewing gum base products supplied by Dreyfus Company are identified by the trademarks NOVA, DREYCO and FIRM PALOJA.

The FIRM PALOJA chewing gum base is defined by a composition like that of PALOJA. The percentage of each constituent, however, differs somewhat. To this end, natural masticatory substances are included in an amount of 4 to 15%, synthetic masticatory substances are included in an amount of 44 to 65%, plasticizing materials are included in an amount of 12 to 30% and water-insoluble adjuvants are included in an amount of 12 to 20%. The antioxidant, likewise, is limited to not more than 0.1%.

Both the NOVA and DREYCO chewing gum products include synthetic masticatory substances in an amount of 31 to 49% and 20 to 35%, respectively, plasticizing materials (softeners) in an amount of 37 to 52% and 30 to 40%, respectively, water-insoluble adjuvants (calcium carbonate) in an amount of 9 to 21% and 30 to 40%, respectively, and no more than 0.1% antioxidant, for each. The antioxidants are butylated hydroxyanisole and butylated hydroxytoluene, respectively.

The Dreyfus Company also supplies bubble gum base products identified by the trademarks LADCO, MAGNA III and EXTRA SOFT. Each of these products includes synthetic masticatory substances, plasticizing materials (softeners) and water-insoluble adjuvants (calcium carbonate). The products identified as LADCO and EXTRA SOFT also include not more than 0.1% antioxidant (butylated hydroxytoluene). The percentages of synthetic masticatory substances are 12 to 30%, 42 to 58% and 11 to 26%, respectively; the percentages of plasticizing materials (softeners) are 47 to 63%, 25 to 37% and 42 to 59%, respectively; and the percentages of water-insoluble adjuvants (calcium carbonate) are 20 to 33%, 11 to 21% and 28 to 37%, respectively.

The chewing gum base products are preferred in use in the invention, and a typical chewing tobacco product of the invention may contain the following constituents:

| Constituent | Percentage Composition |
| --- | --- |
| Gum Base | 20 to 35% |
| Gum plasticizer | 0 to 5% |
| Humectant (glycerine) | 0 to 12% |
| Sweeteners | 0 to 16% |
| Tobacco Casing | 23 to 38% |
| Tobacco | 20 to 38% |

The gum base of the chewing gum product may be either a chewing or bubble gum base. The PALOJA or FIRM PALOJA chewing gum base and the LADCO bubble gum base may be considered as the preferred gum bases. The gum plasticizer, also supplied by the L. A. Dreyfus Company, is a plasticizer identified by the trademark LADCO. This plasticizer includes synthetic masticatory substances in the range of 20 to 55% and plasticizing materials (softeners) in the range of 45 to 75%.

The preferable humectant in this typical chewing tobacco product is glycerine. Other humectants, such as propyleneglycol may be used, also. Suitable sweeteners include corn syrup, sorbitol, manitol, sucrose and artificial and natural low caloric sweetening agents, such as Aspartame. The tobacco casing is a mixture of flavors, sweeteners and humectants commonly used in chewing tobacco products.

Suitable tobaccos include fermented and unfermented tobaccos, air cured or burley, flue cured, and cigar filler or wrapper as well as the products from the whole leaf stemming operation. Alternatives and variations include the use of tobacco leaf or lamina as an outside wrapper to help the appearance of the finished homogenized portions of chewing tobacco product. In addition, scrap size tobacco lamina may be commingled with homogenized product for the purpose of controlling the texture and flavor release during mastication. The nicotine level of the finished product is in the range of 0.3 to 5 percent to satisfy the chewer's physiological response to the alkaloid.

In the product preparation the gum base and plasticizer, with or without the humectant, sweetener and casing, is heated in a suitable mixer, such as a sigma blade mixer to soften the gum base and plasticizer. Cased or uncased tobacco is added to the softened gum base and the gum-tobacco mixture may be allowed to stand up to 30 minutes to attain temperature equilibrium. The ingredients, then, are blended in the mixer for 2 to 10 minutes until a uniform product is obtained. In the final blending stage flavors which are heat sensitive or which are very volatile may be added at the lowest practicable temperatures, and with the minimal required mixing.

The following specific but non-limiting Examples demonstrate the compositions and methods according to the invention.

EXAMPLE 1

429.9 grams tobacco casing, 22.1 grams of plasticizer, 85.8 grams sucrose, 175.2 grams of glycerine and 446.8 grams of PALOJA chewing gum base were added to a preheated sigma blade mixer and blended to a uniform consistency. 300 grams of finely ground tobacco were added in the mixture and blended to a uniform consistency. A pliable, pleasant tasting product was produced.

EXAMPLE 2

454.9 grams of tobacco casing, 22.1 grams of plasticizer, 85.8 grams of sucrose, 175.2 grams of glycerine and 446.8 grams of PALOJA chewing gum base were added to a preheated sigma blade mixer and blended to a uniform consistency. 400 grams of tobacco, cut to pass a 7/16 opening screen, were added to the mixer and blended to a uniform consistency. A pliable, pleasant tasting product was produced.

EXAMPLE 3

322.1 grams of tobacco strip was sprayed with 75 ml water and mixed with 64.8 g of 40% solids corn syrup, 12 g sucrose, 132 g glycerine and 369.1 g of tobacco casing. The mixture was added to 300 grams of PALOJA chewing gum base that had been softened in a steam jacketed sigma blade mixer. The gum-tobacco mixture was allowed to stand for 30 minutes to attain temperature equilibrium and then blended for two minutes. A plug tobacco-like product with pleasant taste properties was produced.

EXAMPLE 4

289 grams tobacco casing, 72 grams corn syrup, 54 grams sucrose and 40 grams glycerine were heated to 50° C. and mixed. The casing mixture was blended with 251 grams finely ground tobacco milled to pass a ½ mm screen and added to 250 grams LADCO bubble gum base and 46 grams LADCO plasticizer that had been softened and blended in a sigma blade mixer that had been preheated to 100° C. The resultant mixture was blended for five minutes, removed, flattened to a ⅜ inch cake and cut into rectangular strips or round discs for evaluation. A pleasant tasting integral chewing product resulted.

The above formula was modified by the use of additional flavoring. Using the mixture as prepared above, 0.5 to 1% of methyl salicylate flavoring was blended into the product prior to removing the batch from the mixer. The resulting tobacco chewing product had a pleasing tobacco and wintergreen flavor that was preferred by several chewers.

EXAMPLE 5

375 grams ground tobacco milled to pass a ½ mm screen and 100 grams water were added to 375 grams tobacco casing warmed to 50° C. The tobacco-tobacco casing mixture was added to 250 grams PALOJA chewing gum base that had been softened in a preheated sigma blade mixer and blended for five minutes. The resulting mixture was removed from the mixer, flattened into a ⅜ inch thick cake and cut into rectangular strips for evaluation. The product produced a soft chew with a high level of tobacco taste.

EXAMPLE 6

200 grams of water was sprayed onto 296.4 grams strip tobacco and the softened tobacco added to 359.6 grams tobacco casing that had been preheated to 60° C. The tobacco-tobacco casing mixture was added to 344 grams PALOJA chewing gum base that had been softened in a preheated sigma blade mixer and blended for two minutes. The resultant product was pressed into a ½ inch cake and cut into rectangular strips for evaluation. The product produced an integral chew with good tobacco flavor. The product texture reflected its content of larger tobacco particle.

EXAMPLE 7

550 grams of a commercial chewing tobacco, ground to pass a ½ mm screen, 160 grams corn syrup, 80 grams glycerine, 10 grams LADCO plasticizer and 200 grams PALOJA chewing gum base were added to a preheated sigma blade mixer and blended for ten minutes. The product was removed from the mixer and rolled into a ½ inch thick cake. The cake was cut into rectangular strips for evaluation. The resultant product produced a soft, sweet and integral chew with good tobacco taste.

It will be apparent from the chewing of the products of the previous Examples that the size of tobacco used in the chewing product is important both with regard to texture and homogeneity of the product. The tobacco, accordingly, was preferably ground with at least one-half of the ground tobacco passing through an 80 mesh screen.

Obviously many modifications and variations of the invention may be made without departing from the essence and scope thereof and only such limitations should be applied as are indicated in the appended claims.

We claim:

1. A chewing tobacco product which maintains integrity during mastication characterized by substantially uniform release of flavor as the product is chewed, uniform texture of product, and a smooth chew, comprising a blend of 10 to 70% of tobacco, a gum base serving as a blending material for said tobacco, said gum base present in an amount of 20 to 75% of the product, a gum plasticizer, a glycerin humectant present in the amount of 2 to 12% of the product, and sweetening and flavoring agents.

2. The chewing tobacco product of claim 1 wherein the gum base is one of a commercial chewing gum base and a bubble gum base, as well as natural gum base materials.

3. The chewing tobacco product of claim 2 wherein the gum base is PALOJA chewing gum base.

4. The chewing tobacco product of claim 2 wherein the gum base is LADCO bubble gum base.

5. The chewing tobacco product of claim 1 containing up to 5% of gum plasticizer compatible with said gum base component.

6. The chewing tobacco product of claim 1 wherein the sweeteners are selected from the group consisting of simple sugars, invert syrups, corn syrup, sucrose, manitol, sorbitol and low caloric natural and artificial sweeteners.

7. The chewing tobacco product of claim 6 wherein the sweeteners are present in an amount of no more than 16% of the product.

8. The chewing tobacco product of claim 1 wherein the tobacco is a mixture of 20 to 38% particulate tobacco and 23 to 38% tobacco casing.

9. The chewing tobacco product of claim 8 wherein the tobacco casing is a mixture of flavors, sweeteners and humectants prepared for use in tobacco and chewing tobacco products.

10. The chewing tobacco product of claim 1 wherein said tobacco is a finely ground, particulate tobacco capable of passing a 1 mm screen.

11. The chewing tobacco product of claim 1 wherein said tobacco will pass a 7/16 inch screen.

12. The chewing tobacco product of claim 1 wherein said tobacco as may be received from a stemmer, is in strip form.

* * * * *